June 1, 1937.　　　I. H. DUNHAM　　　2,082,446
ADJUSTABLE GEAR REDUCTION UNIT
Filed Dec. 24, 1934　　　2 Sheets-Sheet 1

Inventor
I. H. Dunham

June 1, 1937.　　　　I. H. DUNHAM　　　　2,082,446
ADJUSTABLE GEAR REDUCTION UNIT
Filed Dec. 24, 1934　　　2 Sheets-Sheet 2

Inventor
I-H-Dunham
By
Attorneys

Patented June 1, 1937

2,082,446

UNITED STATES PATENT OFFICE 2,082,446

ADJUSTABLE GEAR REDUCTION UNIT

Irvie H. Dunham, Racine, Wis., assignor to Electric Motor Corporation, Racine, Wis., a corporation of Wisconsin Application December 24, 1934, Serial No. 759,083

2 Claims. (Cl. 74—383)

This invention appertains to motors, and more particularly to speed reduction gearing for electric motors.

In reduced speed gearing, the driven shaft is set at a certain angle relative to the motor base, and is extended beyond one side of the motor to drive the desired work. It often happens that the set angle is unsuitable for driving the work, and the shaft will be disposed on the wrong side of the motor. Thus, difficulty in installing the motor and inconvenient assembly often result.

It is, therefore, one of the salient objects of my invention to provide novel means for adjustably associating the gear reduction unit with the motor casing and armature shaft, whereby the unit can be quickly and conveniently disposed and held at any desired angle relative to the base, which is best suited for the work to be driven.

Another important object of my invention is the provision of novel means for adjustably mounting the driven shaft in the gear unit, whereby the shaft can be slid longitudinally in the unit, and thus be protruded beyond the desired side of the motor.

A further object of my invention is the provision of a motor casing having an axially disposed boss on one end thereof, through which the armature shaft extends, with an annular ring supporting the reduction unit rotatably mounted on the boss and against the mentioned end wall of the motor, whereby the unit can be readily turned on the motor casing and about the armature shaft, means being provided for securely holding the ring in the desired adjusted position.

A further object of my invention is the provision of a gear reduction unit of the worm and worm wheel type in which the driven shaft carrying the worm wheel is slidably supported by bearing arms rigidly connected with one side of the supporting ring, the motor casing being provided with an annular row of threaded openings for selectively receiving the fastening screws carried by the ring, the arrangement being such that the driven shaft can be slid from one side of the motor to the other, and the ring held in an adjusted position around the armature shaft.

A further object of my invention is the provision of means for insuring the lubrication of the bearings for the driven shaft, said means including wicks saturated with a lubricant fitted within bores formed in the bearing arms.

A still further object of my invention is to provide novel means for adjustably associating a gear reduction unit with a motor, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings—

Referring to the drawings in detail, wherein similar reference characters designate corresponding parts throughout the several views, the letter M generally indicates an electric motor, and S the speed reduction gearing therefor.

Figure 1:
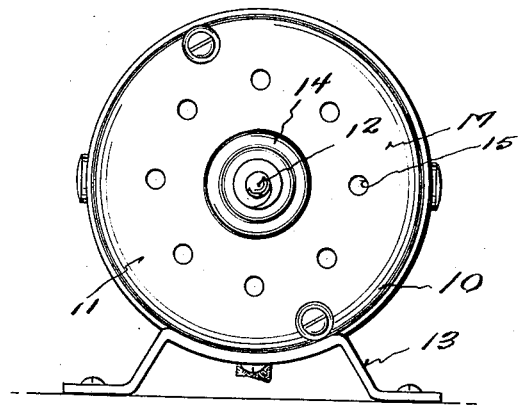
Figure 1 is an end elevation of an electric motor constructed in accordance with my invention, with the gear reduction unit removed.
Figure 2:
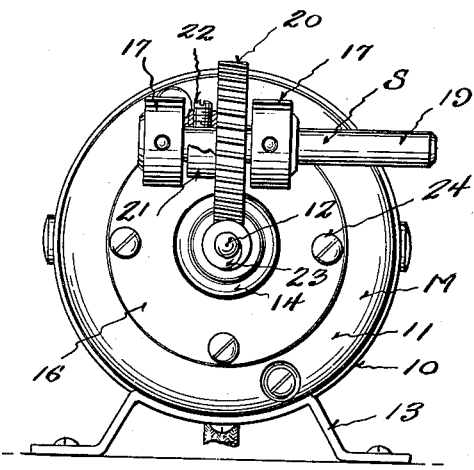
Figure 2 is an end elevation of the motor with the gear reduction unit applied thereto, parts of the unit being shown broken away and in section to illustrate structural details.
Figure 3:
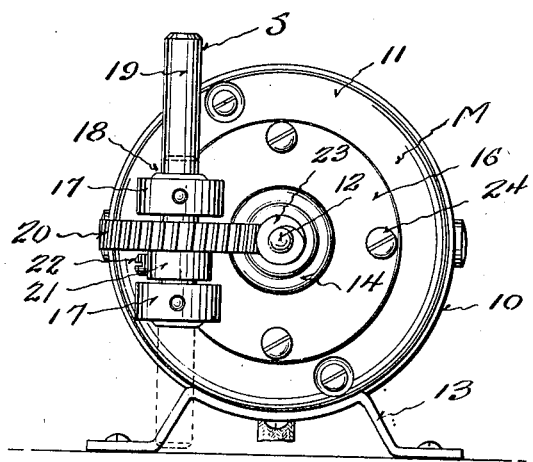
Figure 3 is a view similar to Figure 2, showing the reduction unit moved to another desired position.
Figure 4:
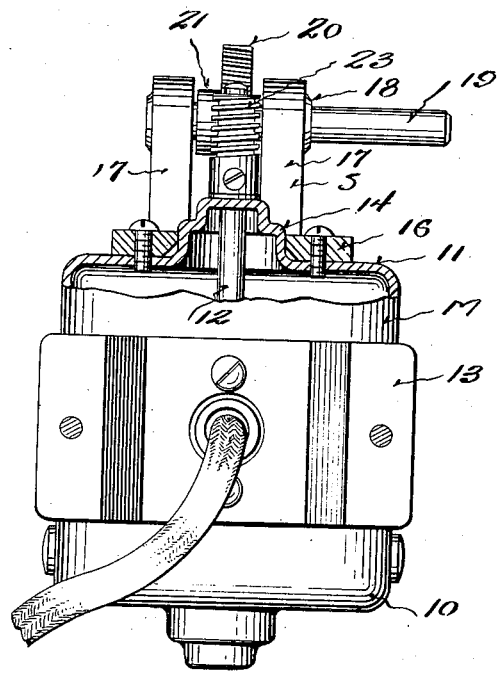
Figure 4 is a bottom plan view of the motor and gear reduction unit, showing parts thereof broken away and in section to illustrate structural details.
Figure 6:
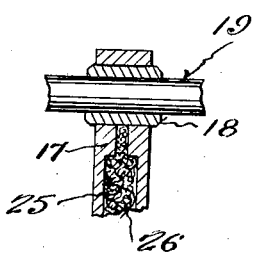
Figure 6 is a fragmentary section through one of the bracket, or bearing, arms, showing the lubricating means for the bearing of the driven shaft.

The motor M comprises a casing 10, having an end wall 11 through which rotatably extends the armature shaft 12. Any desired type of base or supporting bracket 13 can be provided for the motor.

In accordance with my invention, the end wall 11 of the casing 10 is provided with an axially disposed boss 14 which surrounds the armature shaft, and an annular row of threaded openings 15 is formed in the end wall around the boss.

The gear reduction unit S comprises an annular supporting plate, or ring, 16 which is adapted to be fitted snugly against the end wall of the motor casing around the boss 14. Hence, the boss forms a guide, or bearing, for the annular plate 16 when the same is turned axially around the armature shaft 12, for a purpose which will be later set forth.

The plate 16 has formed thereon or secured thereto in any desired manner a pair of spaced supporting, or bracket, arms 17. These arms receive the bearings 18 for the driven shaft 19. The driven shaft 19 is slidably mounted in the bearings as well as rotatably mounted therein, for a purpose which will also be later set forth.

Fitted on the driven shaft 19 between the arms 17 is a worm wheel 20, and its hub 21 carries a set screw 22. By releasing the set screw, the shaft 19 can be slid longitudinally to either one side or the other of the motor, as may be desired. This worm wheel 20 meshes with the worm 23, which is keyed or otherwise secured to the armature shaft 12. The worm wheel 20 will remain constantly in mesh with the worm when the ring, or annular plate, 16 is turned on the boss 14 for moving the gearing to the desired set position.

The ring 16 carries screws 24 which can be selectively fitted within the threaded openings 15 for securely holding the ring, or plate, 15 in place, and the bearing at the desired angle relative to the base 13.

Thus, it can be seen that an exceptionally simple means has been provided for permitting the holding of the driven shaft 19 in any preferred adjusted position, and at the same time insuring the proper meshing of the gear 20 with the worm 23.

If preferred, the ring, or plate, 16 can be provided with ventilating openings (not shown) between the screws 24, and these openings can register with the openings 15 not engaged by the screws 24.

It is preferred to form the supporting arms 17 hollow or with bores 25 for the reception of a suitable packing 26 impregnated with a lubricant. This packing 26 bears against the bearing 18 for the driven shaft 19. The bearing 18 is formed from a particular type of metal alloy, which permits the oil to seep therethrough. In other words, the oil maintains the bearing 18 in moist condition.

Figure 5:
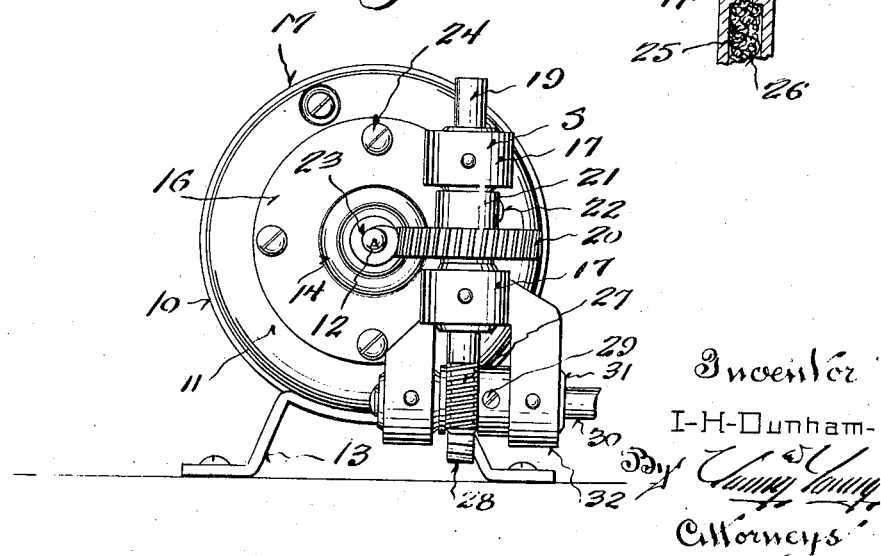
Figure 5 is an end elevation illustrating a double reduction gear unit.

While I have shown one preferred type of gear reduction unit, obviously my invention is applicable to other types of gear reduction units, and in Figure 5 I have shown a double gear reduction unit. In this form the driven shaft 19 is provided with a worm 27, which meshes with a worm wheel 28 keyed or otherwise secured, as at 29, to a power take-off shaft 30. The shaft 30 is rotatably and slidably mounted in suitable bearings 31 carried by the supporting arms 32. These supporting arms 32 can be formed on one of the arms 17.

The shaft 30 can be slid longitudinally in its bearings by releasing the screw 29 of the worm wheel 28, and when the shaft is disposed in the desired position the screw can be re-tightened. Obviously, the shaft 30 can be disposed at any preferred point around the casing by loosening the holding screws 24 of the ring, or plate, 16.

Changes in details may be made without departing from the spirit or the scope of my invention, but what I claim as new is:—

1. An electric motor comprising a casing having an end wall, an axially disposed boss formed on the end wall, an armature shaft extending axially through the boss, an annular plate fitted against said end wall and rotatably mounted on the boss, releasable means holding the plate in a preferred adjusted position on said end wall, supporting arms rigidly secured to the plate at one side of the armature shaft, a driven shaft rotatably supported by the arms, and a gearing including said shaft carried by the plate driven from the armature shaft and disposed at one side thereof.

2. An electric motor comprising a casing having an end wall, an axially disposed boss on said end wall, an armature shaft extending axially through the boss, an annular plate fitted against said end wall and rotatably mounted on the boss, said end wall being provided with an annular row of internally threaded openings, screws carried by the plate for fitting in selected openings, bearing arms rigidly carried by the plate and disposed at one side of the armature shaft, a driven shaft rotatably supported by the arms, and a gearing connection between said shafts.

IRVIE H. DUNHAM.